INVENTOR.
LLOYD MANCEBO

BY

ATTORNEY

Aug. 11, 1970     L. MANCEBO     3,524,097
HIGH POWER HYDROGEN THYRATRON
Filed April 19, 1968     2 Sheets-Sheet 2
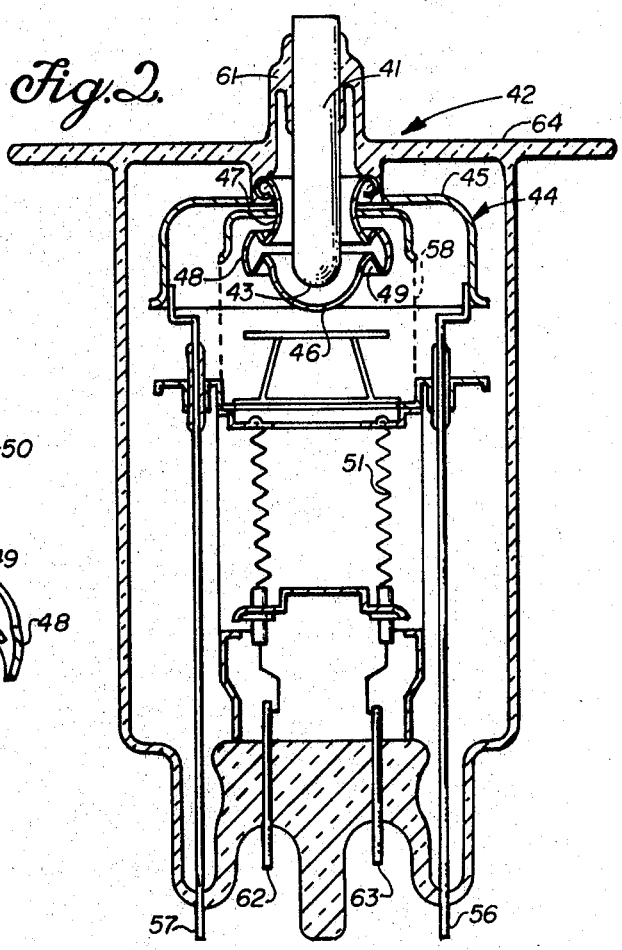
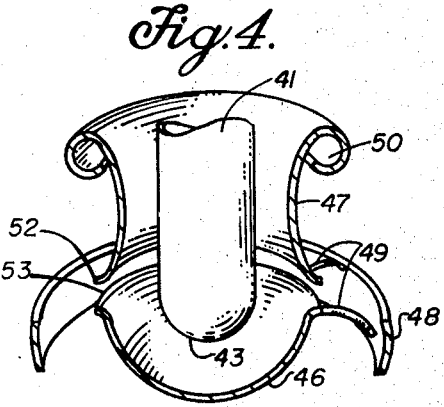
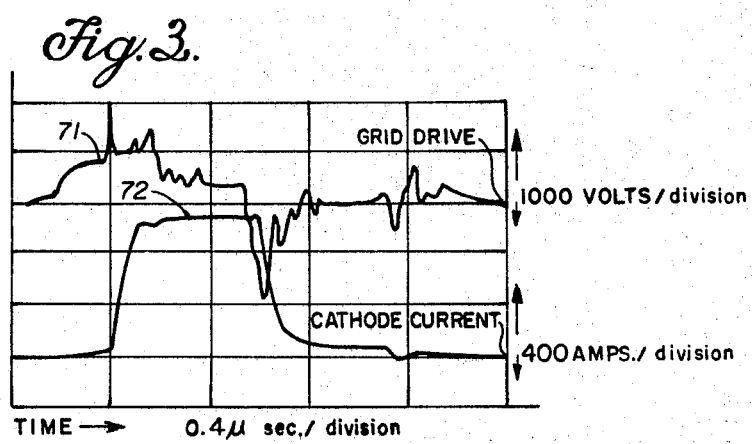
INVENTOR.
LLOYD MANCEBO
BY
ATTORNEY

United States Patent Office 3,524,097
Patented Aug. 11, 1970

3,524,097
HIGH POWER HYDROGEN THYRATRON
Lloyd Mancebo, Livermore, Calif., assignor to United States of America as represented by the United States Atomic Energy Commission
Filed Apr. 19, 1968, Ser. No. 722,753
Int. Cl. H01j 17/12
U.S. Cl. 313—193            9 Claims

ABSTRACT OF THE DISCLOSURE

A thyratron type tube having a new grid-anode structure to achieve standoff voltages over 50 kilovolts in which the grid is coaxially spaced on the order of a gas atom mean-free-path from an elongated anode and between which very intense electric fields exist without sparking. Grid shells, some of which are cross sectionally concave and others convex about the anode, distribute the electric field over wide areas to deter field emission. The anode similarly reduces electric field stress with rounded contours over the whole anode surface.

BACKGROUND OF THE INVENTION

This invention was conceived under, or in the course of, Contract W–7405–ENG–48 with the United States Atomic Energy Commission.

Field of the invention

This invention pertains to gas-filled discharge tubes for holding off tens of kilovolts, and, more particularly, to an improved grid-anode structure for achieving standoff voltages over 50 kv. in thyratron type tubes.

Prior art

Thyratrons are gas-filled, three- or four-electrode tubes used principally for electronic control work. An anode, to which a high voltage is applied, remains non-conducting until triggered by a control grid. The maximum standoff voltage on the anode is that voltage which initiates field emission from the grid. Although there is a need for thyratrons which can hold off 50 kilovolts or more, the field emisison limit between anode and grid has prevented development of such tubes.

Traditionally, thyratron anodes are disks or hollow cylinders nearest the apex of the tube bulb. Usually the grid coaxially surrounds at least a portion of both the anode and cathode, shielding one from the other with a baffle therebetween. Often the grid includes slotted disks and mesh screens. See, for example, Pulse Generators, by Glascoe and Lebacqz (ed.), McGraw-Hill, Radiation Laboratory Series, volume 5, pp. 337–339, which shows early work in the field by K. J. Germeshausen. For such electrode structures, the field emission limit is usually about 40 kev. or less.

To attain standoff voltages higher than 40 kilovolts, anodes and grids of lower voltage tubes have been combined in series within a single tube envelope. However, failure of one member of the series usually extinguishes the utility of the whole tube.

SUMMARY OF THE INVENTION

My object is to produce a gas discharge tube with a single grid-anode structure capable of operating above 50 kilovolts.

This object is achieved by departing from the traditional grid-anode structure so that the field emission limit occurs at much higher limiting voltages. The present tube includes a grid-anode structure which reliably holds off voltages of the order of 100 kilovolts without disruptive field emission.

The new structure is realized in part by smoothly contoured grids and anodes, viz., a grid and an anode in which the electrical effects of corners, holes, etc., are substantially reduced. A pair of nested, rounded surfaces, i.e., concentric hemispheres, parabolas, or combinations thereof, are an example of smoothly contoured electrodes. The grid comprises annular coaxial shells between which apertures exist to admit electrons. The grid apertures have outwardly turned and rounded edges with respect to the anode. Thus, apertures exist further away from the anode than the distance of the remainder of the grid. Edges of the grid shells are further from the anode than central portions thereof. To further reduce the electrical effects of grid apertures, the outwardly turned and rounded shell edges may be covered with a bridge segment which covers a portion of the aperture. Accordingly, the anode does not experience the presence of the electrical effects of nearby abruptly discontinuous surfaces as in the prior art. There is no apparent concentrated area of electric field stress tending to cause field emission. The improved electrode structure shifts the maximum standoff voltage upward, enabling 100-kilovolt standoff voltages to be attained. A preferred embodiment may be viewed in the figures which follow.

DESCRIPTION OF THE FIGURES

FIG. 2 shows a view of another preferred embodiment of the present invention.

FIG. 3 is a plot of grid voltage versus time, and cathode current versus time in firing the gas discharge tube of the present invention.

FIG. 4 is an enlarged view of the grid structure of FIG. 2.

With reference to FIG. 1, gas-filled tube 10 includes a tube envelope 38, electrodes 12, 23, 20, heat shield 36, diffuser 34, together with ancillary supports, lead-ins, and insulators. A gas reservoir, not shown, supplies gas upon heating. The electrodes consist of at least one cathode, grid and plate.

Figure 1:
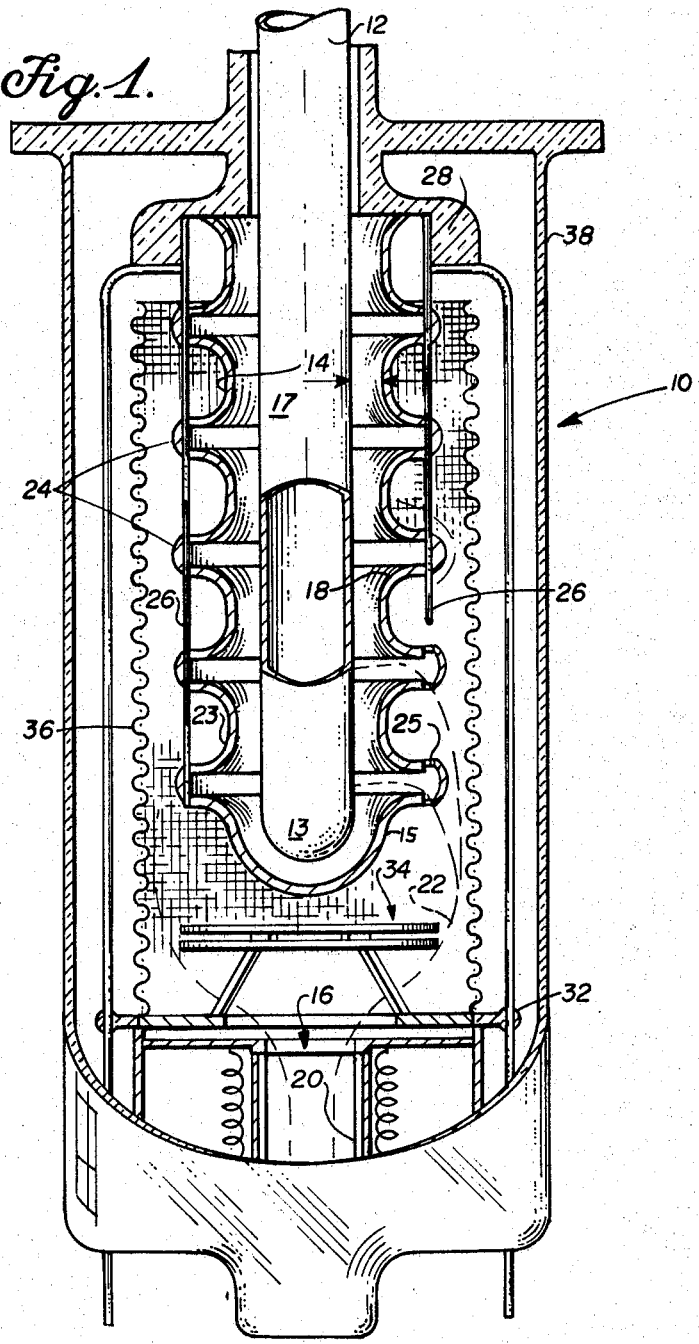
FIG. 1 is a cutaway view of a preferred embodiment of the inventive grid-anode structure.

Anode 12 is a hollow, elongated, closed electrode, having a surface which is smoothly rounded at generally all regions within the tube envelope, and especially at those regions nearest grid 23. Unlike an anodic disk or cylinder, each of which has a pair of circular edge regions, anode 12 has a cornerless surface. The cornerless surface of anode 12 is a combination of smoothly varying surfaces, i.e., a hemispherical region 13 joined with a cylindrical region 17. Other elongated, cornerless, smoothly varying surfaces such as elongated parabolas would be equally appropriate.

Although the examples of smoothly varying surfaces are quadratic surfaces, i.e., smooth two-dimensional curves revolved about a symmetry axis, this is not a requirement. Any smoothly varying surface satisfying the requirements described herein should work.

Since elongated anode 12 is closed at hemispherical end 13, water-circulating jets (not shown) may be inserted at another end. Water circulation allows higher gas densities to exist in the neighborhood of the anode, hence higher currents. It is preferable that the anode have a cylinder radius greater than 200 mils.

Grid 23 departs severely in construction from conventional slotted disks and cylindrical sheaths of the prior art. Grid 23 is electrically insulated from anode 12 and spaced therefrom with grid support 26. Anode 12 is partially nested within grid 23. Grid segments 14 are adjacent annular shells coaxially disposed about anode 12 from its hemispherical end 13 to its projection through tube envelope 38. Annular shells 14 are nearest to anode 12 at their central portions and furthest away at edge regions 18. Shells 14 are outwardly turned from anode 12 at edge regions 18 so that they are convex with respect to anode 12. A second group of annular shells 24 electrically connect adjacent regions 14 at their peripheral regions, thereby forming a bridge between them. The second group of annular shells 24, like the first annular shells 14, have a smoothly rounded surface. A narrow gap between the second annular shells 24 and the extremity of the grid edge regions 18 allows electrons to flow through, once they experience the appropriate electrostatic forces. Ordinarily, such a gap near the anode would cause concentrated electric field stresses at the gap edges. In the present device, the gaps are removed from the proximity of the anode so that the electric field stress is more uniformly spread over wide grid areas it is preferable that the width of such electron passageway be of the order of 80 mils. A bowl-shaped grid shell 15 is generally equidistantly spaced from the centrally extending end 13 of anode 12. Shell 15 is rounded similar to grid shells 14, but has a contour resembling that of anode end 13.

Grid 23 is only about 100 mils away from anode 12 at its most proximate central regions, and about 150 mils away near the second annular shells 24.

Cathode 20 is a heavy duty, indirectly heated thermionic emitter of the oxide type well known in the art. Cathode 20 is disposed below baffle 34 in a position hidden with respect to grid structure 23. An aperture 16 enables the electron emission region of cathode 20 to communicate with grid 23 when grid 23 is pulsed. The cathode structure itself may be any structure which will produce a peak current of 500 amperes, an average current of about 0.5 ampere and a root mean square average current of about 16 amperes. Such cathodes are well known in the prior art. Cathode 20 is usually shielded by a metallic enclosure for dissipating heat. Cathodes are extensively discussed in the book, "Fundamentals of Vacuum Tubes" by Eastman, McGraw-Hill, 1949.

In the preferred embodiment of FIG. 2, an anode 41 projects through tube envelope 42 from its periphery toward the central tube portion. Anode 41 is generally cylindrical, having a rounded hemispherical end region 43. The radius of the hemispherical region 43 is equal to the radius of the anode cylindrical radius.

A grid 44, shown in an expanded view of FIG. 4, includes, a plurality of generally symmetric conductive shells, uniformly spaced from anode 41. Each shell has smoothly rounded surfaces surrounding portions of the anode. The shells include a bowl-shaped shell 46 uniformly spaced from the hemispherical anode region 43 with conforming curvature. A first annular shell 47 is adjacent to the bowl-shaped shell. Annular shell 47 is coaxial with the anode and has an edge circumference 52 approximately equal to the edge circumference 53 of the bowl-shaped shell 46. The space between the aforementioned shells defines an electron passageway. A second annular shell 48, also coaxial with the anode and connected to the first annular shell 47, forms a bridge over the electron passageway. Conductive spacers 49 maintain a fixed separation between the second annulus 48 and the inner grid portions: first annulus 47 and bowl-shaped segment 46.

Note that each grid segment is gently contoured. A specific radius of curvature characterizes each contour. The electric field at the generally spherical surface of the conductor due to a voltage existing between the surface and another electrode is $$E \cong V/r \quad (1)$$

where E is the electric field, V is the voltage between the generally spherical surface and the other electrode, and r is the radius of curvature of the surface. Equation 1 applies to the case where surfaces resemble portions of spheres. For example, a sharp corner approximates a portion of a very small sphere. In the spherical case, the localized electric field can become such larger than in the case of other electrode shapes, i.e., planar or cylindrical shapes. In order to distribute electric field stress along the surface of an electrode, small radii of curvature are avoided. Sharp corners and edges, as viewed from the anode, are deleterious. Hence the upper and lower regions 50 and 52 of first annulus 47 are rounded. Similarly, bowl-shaped grid segment 46 has a rounded lip 53. It is apparent that the rounded grid edges enlarge r compared to sharp-cornered edges with very small r. According to the Equation 1, the grid with rounded edges will have much lower electric field compared to a grid with sharp-cornered edges, i.e. very small r. For the equal magnitude electric fields, the present apparatus will hold off much higher voltages compared to the tubes with prior art sharp-cornered electrodes.

The hat-shaped grid portion 45 serves to transmit voltages from the leads 56, 57 to the first grid annulus 47. Secondarily, the wide area of hat portion 45 radiates heat away from the anode region. A cylindrical wire mesh 58 collects heat from the central tube regions, also radiating it outwardly. Cathode 51 is similar to that described in FIG. 1.

Tube envelope 42 has an anode entry region 61 which is extruded to lengthen the separation from the top of the anode to the low potential leads 56, 57, 62, 63 at the bottom of the tube. For the same reason, the tube envelope is lengthened across the top with extended envelope upper closure 64.

In operation, the voltage to be held is applied to anode 12. The grid is maintained at a zero bias so that the voltage gradient between anode and grid sets up a strong first electric field between the anode and grid. Such a strong electric field would stress electrodes of the prior art at edge and corner regions. However, the contoured, cornerless surfaces of the anode and grid of the present invention distribute the stress over wide areas so that premature gas breakdown is obviated.

The proximity of the grid and anode (about 100 mils) in the present apparatus permits only a small layer of gas to exist between the two. Hence the gas discharge path between grid and anode is short. Once discharge is initiated, complete avalanche breakdown in the inter-electrode gap is assured in a time much shorter than that occurring between widely spaced electrodes.

To initiate gas breakdown, a positive pulse is applied to the grid, raising the grid to a potential substantially above the cathode. The potential establishes a second electric field between the cathode region and the grid which links the second field with the pre-existing electric field between the grid and the anode. Electrons in the cathode region follow newly created electric field lines toward the grid, whereupon they experience the effects of the strong first electric field, forcing them toward the anode.

After pulsing the grid, travel of electrons from the cathode region toward the grid and anode establishes gas breakdown so that large currents, i.e., hundreds of amperes, can readily flow from cathode to anode. Once an initial breakdown is achieved, viz., in about 200 nanoseconds, anode current continues at a steady level.

FIG. 3 shows a plot of grid drive and cathode current versus time. When the grid is positively pulsed at an instant indicated by line 71, the cathode current begins to rise rapidly. Maximum cathode current is indicated by line 72.

It will be realized that the cathode assembly should include a hydrogen reservoir, not shown in the figures. Such reservoirs are well known, consisting of a titanium cylinder or the like, which liberates hydrogen upon heating.

The invention has been described with reference to annular shells with rounded lateral cross sections. However, any nested, continuous, rounded surfaces are suitable in forming the grid-anode combination described herein.

I claim:
1. A gas discharge tube for holding off kilovolts potentials, comprising:
  (a) a tube envelope having a lower portion and an upper portion;
  (b) a high current cathode disposed within said tube envelope generally near the lower portion;
  (c) an elongated anode extending inwardly from the outside periphery of the upper portion of said tube envelope toward the central portion thereof, said anode having a smoothly rounded surface within said tube envelope;
  (d) a grid including a plurality of symmetric conductive shells having smoothly rounded surfaces, said shells adapted to coaxially surround portions of said anode along the length thereof, said shells including:
    (i) a bowl-shaped shell generally equidistantly spaced from the centrally extending end of said anode;
    (ii) a first annular shell coaxial with said anode, said annular shell adjacently spaced from said bowl-shaped shell with the adjacent peripheral regions of said shells being of nearly equal circumference to define an electron passageway about the entire circumference of said shells;
    (iii) a second annular shell of greater circumference than said bowl-shaped and said first annular shells, said second shell coaxially spaced from said anode at a region partially covering portions of said electron passageway; and
    (iv) conductive spacer means for holding said shells in axial alignment, said spacer means disposed between said second annular shell and the adjacent edges of said bowl-shaped and first annular shells at intervals about the circumference of said shells; and
  (e) electrical leads connected to one of said shells of said grid, said leads extending to the exterior of said tube for activation of said tube when a kilovolt potential is held on the anode and said electrical leads receive a voltage pulse.

2. The discharge tube of claim 1, further defined wherein said anode has a generally cylindrical portion with a hemispherical end portion at said inwardly extending end, said hemispherical end having a spherical radius generally equal to the radius of said cylindrical portion.

3. The discharge tube of claim 1, further defined wherein said anode has a cylinder radius greater than 200 mils.

4. The discharge tube of claim 1, further defined wherein said plurality of smoothly rounded annular grid shells includes a plurality of annular shells identical to said first annular shell and coaxial with said anode, but spaced therefrom and spaced at mutualy adjacent edges forming electron passageways, and a plurality of annular shells identical to said second annular shells, of greater circumference than said first annular shells, partially covering said electron passageways.

5. The discharge tube of claim 1, further defined wherein said first annular shell is convex in lateral cross section with respect to said anode.

6. The discharge tube of claim 1, further defined wherein said second annular shell is concave in lateral cross section with respect to said anode.

7. The discharge tube of claim 1, further defined wherein the closest spacing between said grid shells and said anode is approximately 100 mils.

8. The discharge tube of claim 1, further defined wherein the width of said electron passageway is on the order of 80 mils.

9. The discharge tube of claim 1, further defined wherein said second annular shell is mechanically and electrically connected to said first annular shell.

References Cited
UNITED STATES PATENTS 2,290,086  7/1942  Beldi _____ 313—217 X RAYMOND F. HOSSFELD, Primary Examiner U.S. Cl. X.R.
313—216, 348